US008255923B2

(12) United States Patent
Youel et al.

(10) Patent No.: US 8,255,923 B2
(45) Date of Patent: Aug. 28, 2012

(54) SHARED PERSISTENT COMMUNICATION THREAD

(75) Inventors: Ted Youel, Edina, MN (US); David Smith, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 1085 days.

(21) Appl. No.: 12/169,083

(22) Filed: Jul. 8, 2008

(65) Prior Publication Data

US 2010/0011373 A1 Jan. 14, 2010

(51) Int. Cl.
*G06F 9/44* (2006.01)
(52) U.S. Cl. ........................................ 719/313; 719/318
(58) Field of Classification Search .................. 719/310, 719/312, 313, 315, 318; 709/200, 201, 202, 709/203, 204, 205, 206
See application file for complete search history.

(56) References Cited

U.S. PATENT DOCUMENTS

| | | | | |
|---|---|---|---|---|
| 6,839,417 | B2 * | 1/2005 | Weisman et al. | 379/204.01 |
| 6,952,660 | B1 * | 10/2005 | Matheson | 703/1 |
| 7,051,071 | B2 * | 5/2006 | Stewart et al. | 709/204 |
| 7,051,072 | B2 * | 5/2006 | Stewart et al. | 709/204 |
| 7,143,186 | B2 * | 11/2006 | Stewart et al. | 709/245 |
| 7,184,940 | B2 * | 2/2007 | Matheson | 703/1 |
| 7,249,157 | B2 * | 7/2007 | Stewart et al. | 709/204 |
| 7,418,475 | B2 * | 8/2008 | Stewart et al. | 709/204 |
| 7,870,493 | B2 * | 1/2011 | Pall et al. | 715/751 |
| 7,921,176 | B2 * | 4/2011 | Madnani | 709/207 |
| 7,945,860 | B2 * | 5/2011 | Vambenepe et al. | 715/744 |
| 8,024,410 | B2 * | 9/2011 | Madnani | 709/206 |
| 2002/0010741 | A1 * | 1/2002 | Stewart et al. | 709/204 |
| 2002/0032592 | A1 * | 3/2002 | Krasnick et al. | 705/8 |
| 2002/0124057 | A1 | 9/2002 | Besprosvan | |
| 2002/0156693 | A1 * | 10/2002 | Stewart et al. | 705/26 |
| 2006/0031362 | A1 * | 2/2006 | Chacko et al. | 709/206 |
| 2007/0079249 | A1 * | 4/2007 | Pall et al. | 715/758 |
| 2008/0162651 | A1 * | 7/2008 | Madnani | 709/206 |
| 2009/0003247 | A1 * | 1/2009 | Katis et al. | 370/260 |
| 2009/0003544 | A1 * | 1/2009 | Katis et al. | 379/88.13 |
| 2009/0119678 | A1 * | 5/2009 | Shih et al. | 719/313 |

OTHER PUBLICATIONS

Introduction to Gmail, Web page, first printed, Jun. 16, 2008.

* cited by examiner

*Primary Examiner* — Van Nguyen
(74) *Attorney, Agent, or Firm* — Chapin IP Law, LLC

(57) ABSTRACT

A computer-implemented method and system organizes communications by combining and integrating distinct communication events conducted through diverse communication modes into to a single conversation. Notification of an occurrence of an event is received and, in response to the notification, a conversation object representing a conversation is generated. A plurality of participants is associated with the conversation. A communication entry is associated with the conversation object. The communication entry has a message for at least one of the participants. The conversation object and the communication entry are stored in persistent memory. Shared access to the conversation object stored in persistent memory is limited to the plurality of participants associated with the conversation.

19 Claims, 5 Drawing Sheets

Conversation Application

Managing: Ted >> Conversations >> Andrews, Roy 5/6/2008 8:21 AM

Andrews, Roy Tue 5/6/2008 8:21 AM — 152

- Ted
- Conversations
- Archive
- Colleagues

| | | |
|---|---|---|
| Ted | (Fri 5/2/2008 4:32:23 PM): | Play  Transcribe |
| Roy Andrews | (Fri 5/2/2008 4:59:32 PM): | Read |
| Roy Andrews and will follow up with him. Glad to have you on board! | (Fri 5/2/2008 4:59:32 PM): | Hi Ted, I will see Michael at the conference and will |
| Roy Andrews | (Fri 5/2/2008 5:05:22 PM): | Take a look at this doc: HydrogenCar.pdf |

150

154

Help | Logout 160-1, 160-2, 160-3, 160-4

*FIG. 3B*

SHARED PERSISTENT COMMUNICATION THREAD

FIELD OF THE INVENTION

The invention relates generally to unified communications systems. More particularly, the invention relates to the generating, organizing, and maintaining shared persistent communication threads (SPCT).

BACKGROUND

Technology has brought an abundance of ways by which people may communicate with each other. Mobile phones, traditional landline telephones, voice mail, chat rooms, electronic mail, instant messaging, and text messaging are just some of the well-known mechanisms by which people exchange thoughts, plans, and experiences. Despite the abundance of readily available communication mechanisms, however, communications between individuals remain disjointed, discontinuous, fragmented. Because of the busy schedules of many individuals, initial and subsequent efforts at communication often go unanswered. Often, attempts to establish or maintain communications go ignored, such as voicemails or unanswered emails and telephone calls, although they may play a crucial role in the communication process.

Moreover, studies have shown that frequent interruptions reduce productivity; and having to keep track mentally of many unresolved matters individuals tire and become lethargic. The burden of mentally managing various forms of messages in addition to job responsibilities has exhausted many. Checking email, attending meetings, playing telephone tag are just some examples of activities that drain energy and reduce productivity.

Current efforts in unified communications attempt to improve productivity by centralizing users' communications on a single directory of user, for example, Active Directory by Microsoft Corp. of Redmond, Wash. A directory service, such as Active Directory, centralizes and makes available to clients certain information about users, such as presence, identity, location, and skills. Notwithstanding, directory services typically do little to make conversations between individuals less disjointed and fragmented.

SUMMARY

In one aspect, the invention features a computer-implemented method of organizing communications. Notification of an occurrence of an event is received. A conversation object representing a conversation is generated in response to the notification. A plurality of participants is associated with the conversation. A communication entry is associated with the conversation object. The communication entry has a message for at least one of the participants. The conversation object and the communication entry are stored in persistent memory. Shared access to the conversation object stored in persistent memory is limited to the plurality of participants associated with the conversation.

In another aspect, the invention features a server system comprising means for receiving notification of an occurrence of an event, means for generating a conversation object representing a conversation in response to the notification, means for associating a plurality of participants with the conversation, means for associating a communication entry with the conversation object, the communication entry having a message for at least one of the participants, means for storing the conversation object and the communication entry in persistent memory, and means for limiting shared access to the conversation object stored in persistent memory to the plurality of participants associated with the conversation.

In still another aspect, the invention features a conversation application system, comprising a client system executing a conversation application client, and a server system executing a conversation application server. The conversation application server is adapted to communicate with the conversation application client executing on the client system over a network. One of the conversation application client and conversation application server is adapted to receive notification of an occurrence of an event, generate in response to the notification a conversation object representing a conversation, associate a plurality of participants with the conversation, and associate a communication entry with the conversation object. The communication entry has a message for at least one of the participants. Persistent memory is in communication with the conversation application server. The persistent memory stores the conversation object and the communication entry. The conversation application server is adapted to limit shared access to the conversation object stored in the persistent memory to the plurality of participants associated with the conversation.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 3A and FIG. 3B are diagrams of an embodiment of a graphical user interface by which a user can view a list of conversations and those communication events that make up a selected conversation.

DETAILED DESCRIPTION

In contrast to present communication systems that treat each communication event between parties as an isolated incident, systems embodying the present invention are conversation-centric, focusing upon and tracking communication sessions, referred to as conversations, and organizing and maintaining each individual communication event within the context of a conversation. Such conversation-centric systems use software to generate shared, persistent conversation objects (or threads) to represent conversations between two or more participants. Each conversation object serves as a shared handle by which each designated participant can access the conversation represented by that conversation object and view communication entries associated with that conversation.

Parties can engage in communication events in a variety of ways or modes, for example, through text messaging, cell phone calls, voice mails, desk phones, soft phones, blogs, wiki, instant messaging, and emails. As used herein, a communication event refers to a distinct, separate occurrence of a communication between parties (i.e., person-to-person, person-to-device, device-to-person, or device-to-device). The software operates to combine and integrate such distinct communication events conducted through such diverse modes into to a single conversation.

A software-generated user interface displays together those communication events belonging to a conversation, irrespective of the various mode of communication that may have been used to generate the communication events. Through the user interface, users can initiate a new conversation, view the status of their existing conversations, add a new entry (i.e., a new communication event), add tags, and post articles of information to an existing conversation. In addition, users can search for, review, continue, delete, restore, tag, extend or share, update, transfer, and archive entire conversations in real-time.

Figure 1:
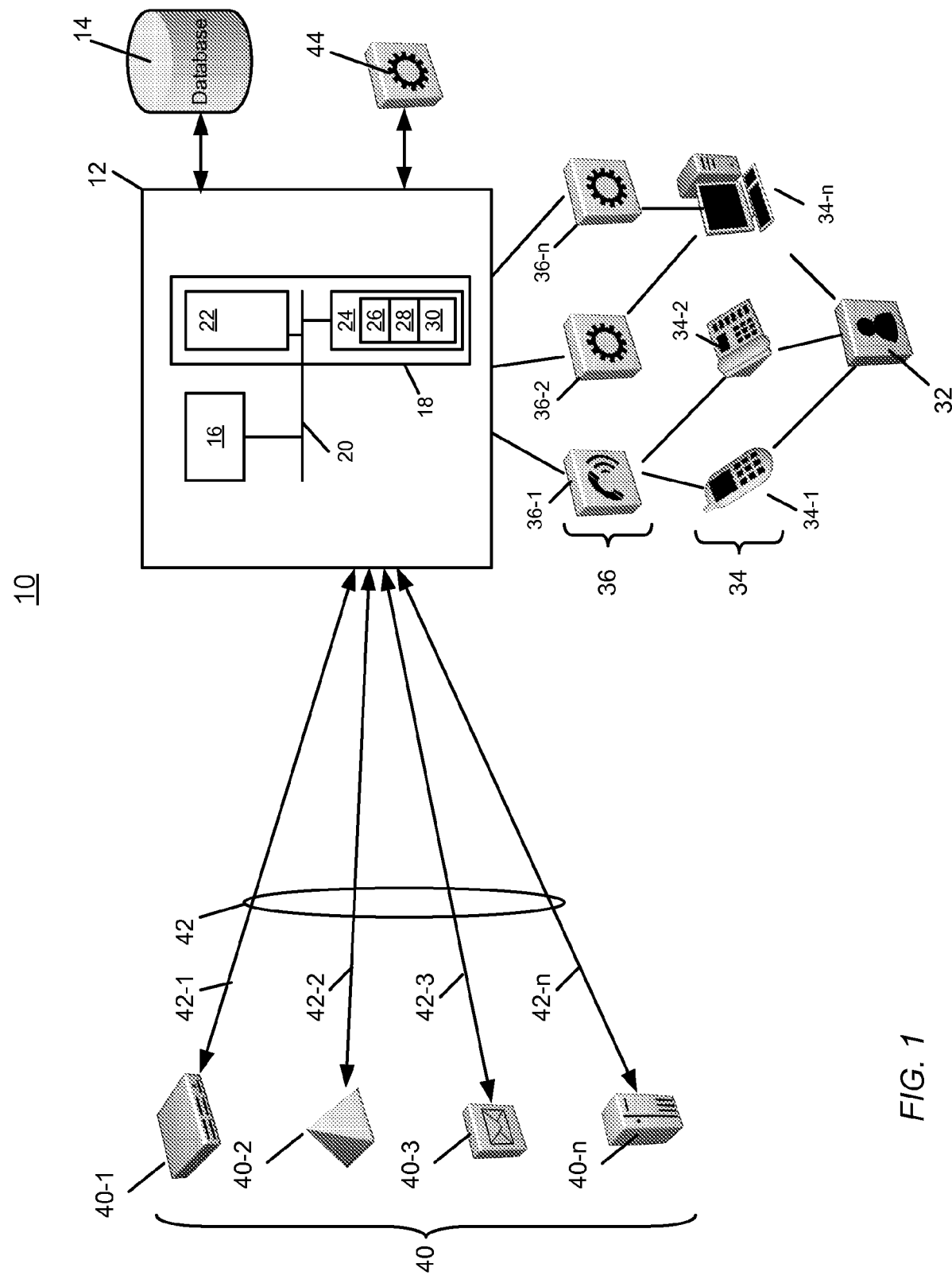
FIG. 1 is a diagrammatic representation of an embodiment of a communications system embodying the invention.

FIG. 1 shows an example of a communications system 10 embodying the invention. The communication system 10 can be deployed within an enterprise or integrated with a public network. Examples of the public network include, but are not limited to, the PSTN (Public Switched Telephone Network), ISDN (Integrated Services Digital Network), FDDI (Fiber Distributed Data Interface), and social networking web sites, such as Facebook or My Space).

The communications system 10 includes a server system 12 in communication with a database (or data store) 14. Although shown separately, the database 14 may be part of the server system 12. In general, the server system 12 is a computing system having a processor 16 in communication with memory 18 over a communications bus 20. The memory 18 includes non-volatile computer storage media, such as read-only memory (ROM) 22, and volatile computer storage media, such as random-access memory (RAM) 24. Typically stored in the ROM 22 is a basic input/output system (BIOS), which contains program code for controlling basic operations of the server system 12, including start-up and initialization of hardware.

Stored within the RAM 24 are program code and data. Program code includes, but is not limited to, application programs 26, program modules 28 (e.g., browser plug-ins), and an operating system 30. Application programs 28 on the server system 12 include a server-side component of a conversation application program (hereafter, a conversation application server) that is in communication with the database 14. In general, the conversation application server provides the linkages between conversations and discrete communication events (which appear as communication entries within the conversations). The conversation application server can be SOA (service-oriented architecture) or SaaS (Software as a Service)-based.

The database 14 stores users' conversations, their related communication entries (each entry corresponding to a communication event), and information associated with the communications entries, including tags, attachments, annotations, text, images, sound files, and pointers to or copies of communications (e.g., emails, call logs, instant messages, and voice mail messages). The database 14 can reside within an enterprise (for those deployments of the conversation application within an enterprise). For use with public networking sites, the database 14 can reside on the public network using an online web storage service (e.g., Amazon S3 web service offered by Amazon.com Inc, of Seattle, Wash.).

A user 32 is in communication with the conversation application server executing at the server system 12 through one of a variety of electronic devices 34. Such electronic devices 34 include, but are not limited to, a mobile phone 34-1, a landline phone 34-2, and a computing system 34-n (in general, the letter n signifies that the communications system 10 can have more than those devices shown). Examples of other electronic devices that can be used include handheld devices and personal digital assistants (PDAs), examples of which include the BLACKBERRY® device produced by Research In Motion Ltd of Waterloo, Ontario and the iPHONE® device produced by Apple, Inc of Cupertino, Calif.

The electronic devices 34 can execute one a variety of application programs 36 to access the server-side component of the conversation application program running on the server system 12. Such application programs 36 include, but are not limited to, a browser application 36-1, an interactive voice response (IVR) application 36-2 which can have text-to-speech conversion capability, and an interactive text or multimedia application 36-n, for example, an email application, a short messaging service (SMS) application, and an instant messaging (IM) application (generally, 36-n).

Typically, communication between the electronic devices 34 and the server system 12 occurs over a network (not shown). Embodiments of the networks include, but are not limited to, local-area networks (LAN), embedded or internal LAN, metro-area networks (MAN), and wide-area networks (WAN), such as the Internet or World Wide Web. Communication links between the electronic devices 34 and the server system 12 can be over a wire or wireless, and the types of connections include, but are not limited to, standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)).

Executing on each of the electronic devices 34 is a client-side software component of the conversation application system that communicates with the server-side software component of the conversation application program running at the server system 12. Preferably, the client-side component of the conversation application program runs continuously on a user's electronic device (e.g., with a representative icon in the system tray on the display screen indicating that the conversation application program is loaded, running, and accessible with a click of the user's input device). The client-side software component may be integrated with other application programs, for example, a web browser, an instant messaging application, and an email application (e.g., Microsoft Outlook®). As used herein, a conversation application system of the invention includes a conversation application client and a conversation application server. Embodiments of the conversation application system may or may not include the database (i.e., persistent store) 14.

A plurality of information sources 40 is also in communication with the server system 12 over respective communication paths 42 for carrying bidirectional communications. Examples of information sources 40 include, but are not limited to, a voicemail server 40-1, a call server (or softswitch) 40-2, an email server 40-3, and an instant messaging server 40-n. Other types of information sources that can by used include calendar servers, identity servers, availability servers, presence servers, location servers, conferencing servers, fax servers, and call recording servers to record voice conversations. Communications systems that embody the invention can have fewer or more information sources than those shown.

In general, each information source 40 sends the server system 12 a notification upon the occurrence of a communication event between parties. The notification includes a copy or a pointer to the storage location of the particular communication that triggers the notification (e.g., an email message, an instant message). Transmission of the pointer, or of a copy, can suffice as the notification. The server system 12 can employ a directory 44 to correlate telephone numbers and email addresses within these notifications to users. Although shown separately, this directory 44 may be part of the server system 12. If an information source transmits pointers, the server system 12 uses the pointers to access the associated communications at their storage locations. Accordingly, separate communications that are part of a given conversation can reside on different servers (e.g., an email message on an email server, and an instant message on an IM server), with the server system 12 having pointers to the storage locations at those servers. Instead of using pointers, the conversation application system can copy all information sources to the conversation application server, directory, and database.

Figure 2:
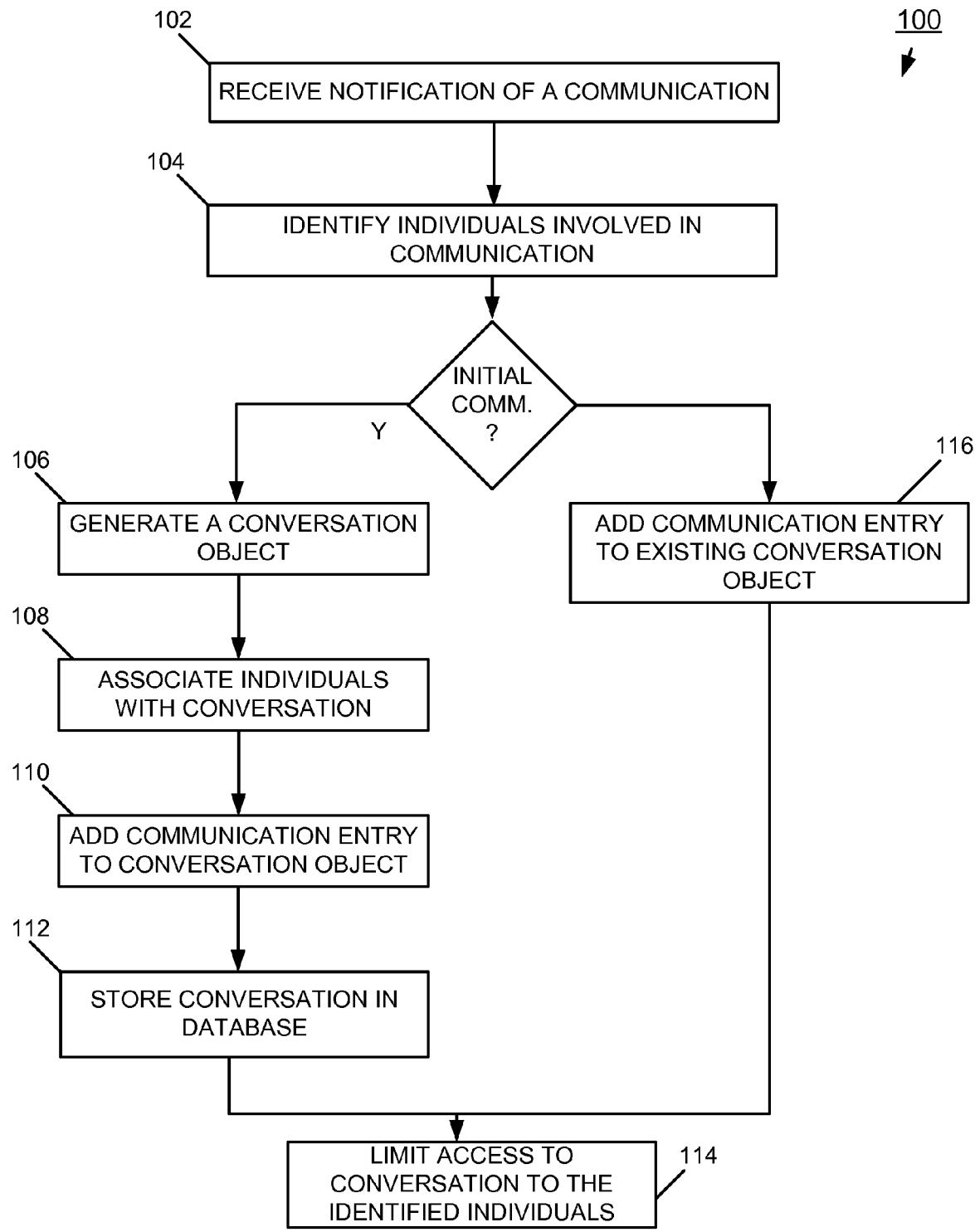
FIG. 2 is a flow diagram of an embodiment of a process for organizing communications into conversations.

FIG. 2 shows an embodiment of a process 100 for organizing communication events into conversations. In the description of the process 100, reference is also made to FIG. 1. At step 102, the conversation application server running on the server system 12 receives a notification from an information source 40 that a communication event has occurred between two or more parties. This notification may arrive unsolicited from the information source 40 or in response to polling of the information source at regular intervals by the conversation application server. Examples of communication events include, but are not limited to, a voice call, a fax mail, a voice mail, a call notification (caller ID, call log), an instant message, an SMS, an email, an RSS (Really Simple Syndication) feed, wiki data, a blog, assignment of a task, a journal entry, and a meeting notice. For example, individual A leaves a voicemail on individual B's answering machine. The voicemail server 40-1 sends a notification to the conversation application server (e.g., with a pointer to the storage location of the call log or to a recorded voicemail).

In response to the notification, the conversation application server determines (step 104) the identities of individuals involved in the communication event. For the purposes of identifying the individuals, the conversation application server may query the user directory 44, using email addresses, cell phone numbers, chat handles or usernames, etc., to identify associated users. If this is an initial communication event between these individuals, the conversation application server generates (step 106) a conversation object to represent this new conversation. The conversation application server also associates (step 108) the identified individuals with the conversation and adds (step 110) a communication entry to the conversation object. The added communication entry typically includes a time stamp and a link (e.g., hyperlink) by which the participants of the conversation can acquire the subject matter of the communication (e.g., a pointer to the storage location of the email message).

The conversation (i.e., conversation object and communication entry) becomes stored (step 112) in the database 14, and the conversation application server limits (step 114) shared access to this new conversation to the identified individuals. Individuals that have shared access to a conversation can each view the conversation from their own electronic device, independently of each other individual with access to that conversation. Subsequently, these individuals may increase the size of the audience with access to the conversation, as described in more detail below.

If, instead, these particular individuals are already engaged in an existing conversation (recorded in the database 14), the conversation application server considers this new communication event to be a continuation of that conversation. In this instance, the conversation application server adds (step 116) a communication entry to the conversation object corresponding to this new communication event. The new communication event thus becomes part of the stored conversation object as the latest communication entry. The participants can later split the conversation into two conversations, or transfer the latest communication entry to another existing conversation (e.g., because the new communication event more appropriately belongs in a different conversation).

If the same participants have multiple active conversations, the new communication event can be added to the conversation with the most recent activity. Alternatively, the users can choose to make one of the active conversations the default conversation for all subsequent communication events from a participant of that conversation. In another embodiment, if there are multiple conversations involving a list of participants, new communication events can be stored in a conversation that is a superset of the list of active conversations. One of the participants can subsequently move the communication event to an appropriate conversation.

Before the conversation application server determines that the new communication is a continuation of an existing conversation, the existing conversation may need to have an active status; that is, new communication entries are not added to archived or closed conversations. An individual who is a participant of an archived or closed conversation can subsequently change its status to active.

Individuals can also initiate conversations through the user interface of the conversation application client running on their electronic devices. In a manner analogous to generating a new email message, an individual can press a graphical button dedicated to opening a new conversation. Activating the button with the click of a mouse can open a communication entry. The user types in a message and identifies each other participant of the conversation. After the user signifies completion of the communication entry, the conversation application client running at the electronic device notifies the conversation application server of the new conversation, identifies its participants, and supplies the initial communication entry. In response, the conversation application server performs the previously described steps 106, 108, 110, 112, and 114 to establish the new conversation. Subsequently, the new conversation becomes available for viewing by each identified participant through the conversation application client of that participant.

The following scenario illustrates an example of a practical application for users being able to initiate new conversations through their conversation application clients. Consider two people having an impromptu face-to-face meeting in a hallway. During their encounter, one or both of the people agree to perform a certain activity (e.g., acquire a document or attend a meeting). Typically, both people would then rely on their memory to remind them later of their obligations. Instead, one of the two people can start a new conversation through a conversation application client, in the hallway through a conversation-application-capable PDA or upon returning to the office computer.

New conversations can also be generated from old, existing communications. Consider, for example, a conversation application client program that has been installed on a client electronics device and that is adapted to adopt (i.e., integrate) pre-existing email messages, etc. into the conversation application system. In one embodiment, a user can select a pre-existing (i.e., historical) communication and initiate a conversation based on that communication. This "historical" communication becomes immediately available to the participants of the conversation. This communication does not need to have been a "successful" communication (e.g., it could have been an email message that became an email in a "sent" folder of the email application or a previously sent IM message).

Another practical use of the conversation application program is for a user to extract communications for which the user is expecting a response Not every conversation requires multiple participants: a conversation can have one participant only, in effect, a user who is engaging in a conversation with himself. The user can initiate such a new conversation through a conversation application client without identifying other participants (the initiator of the conversation, by default, being an identified participant). Such a conversation is analogous to an electronic journal, diary, or blog. The user can use this "solo" conversation to leave personal reminders or to make personal notes. In addition, the user can use privacy settings to make the conversation public and to control the visibility of the communication entries individually.

New conversations can also result from interactions between electronic devices. For example, two people with PDAs can initiate a conversation by bringing their PDAs together or within range of each other. The exchange of communications between the PDAs resulting from bringing them together operates as a signal to the conversation application clients running on these devices to begin a new conversation. The initial participants of the conversation are those individuals identified by the PDAs in the communications exchange. Either of the conversation application clients can subsequently communicate with a conversation application server to forward the information used by the conversation application server to generate the new conversation.

This technique of bringing PDAs together can also operate to add an individual to an existing conversation. The user of a first PDA can select an existing conversation from a list of conversations presented by the conversation application client. While the conversation is selected, the user brings the first PDA into communication with the PDA of the other user. As a consequence of this communication, the first PDA obtains the identity of the other user and uses that identity to add the other user as a participant to the currently selected conversation.

Conversations can also start without any user-initiated action; that is, a person does not need to be the initiator of a conversation. For example, an electronics system can be configured to automatically generate a conversation having a predefined set of participants based on the occurrence of an external event. For example, consider that the external event is a drop in temperature below 35 degrees F. in Brainerd, Minn. Upon detection of the particular event, the electronics system automatically initiates a new conversation, associates the predetermined set of participants (e.g., subscribers to this weather alert) with the conversation, adds a communication entry that provides a notification of the event, and submits the new conversation and communication entry to the conversation application server. This new conversation, with its notification of the drop in temperature, subsequently becomes accessible to each member of the predetermined set of participants when that participant accesses their conversation application client.

Each conversation can have an associated status. As examples, a conversation can have a status of new, currently engaged (e.g., a meeting or chat is currently in progress), ongoing, needs attention, or completed. Conversations can also each have a priority level, for example, high, medium, or low, which can be set manually or automatically based on specified criteria (topic, ID of participants, date and time).

Conversation Application User Interface

Figure 3A:
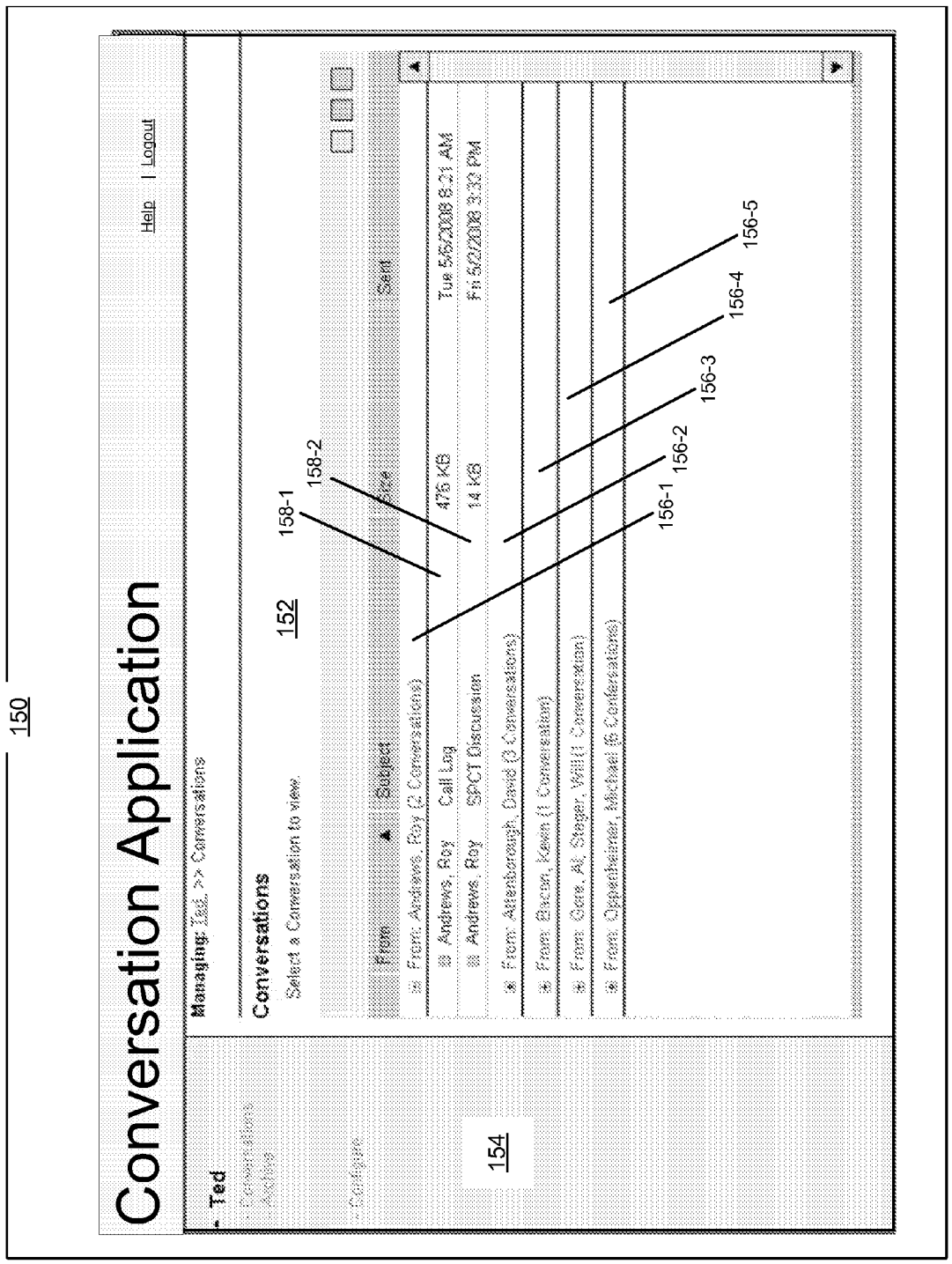

Through the client-side conversation application program running on their electronic devices, users can access their conversations. FIG. 3A shows an oversimplified example of a user interface that may be presented on the display of an electronic device 34 and through which a user can interface with the conversation application. The user interface presents a conversation application window 150 having a major pane 152 and a minor pane 154. In this example, the user of the conversation application is Ted, and the major pane 152 shows a list of Ted's items 156-1, 156-2, 156-3, 156-4, and 156-5 (generally, 156). Each item 156 identifies one or more individuals with which Ted is engaged in a conversation and the number of conversations being held with those individuals. For example, item 156-1 shows that Ted is participating in two conversations with Roy Andrews.

The expansion of item 156-1 reveals line item summaries corresponding to the two conversations 158-1, 158-2 (generally, 158) Ted is having with Roy Andrews. Each conversation 158 has an associated persistent conversation object stored in the database. New conversations or those conversations with new, unread content can have highlighting (e.g., presented in bold format) to alert the user to the presence of changed content. The icon in the system tray representing the conversation application program can also provide another indicator of a new conversation or of new content (e.g., by changing color, or flashing). Each summary provides a brief description of the subject matter of the conversation and a time stamp corresponding to the time and date of origination of the conversation 158. Item 156-3 illustrates an example in which Ted is in a conversation with two others participants. In addition, the user interface enables the user to identify the current presence and availability, and possibly location, of each other participant.

Displayed in the minor pane 154 are Ted's categories of conversations (conversations and archived conversations). The minor pane 154 also includes a "configure" function that the user can activate to manage the conversations, as described in more detail below.

FIG. 3B shows the conversation application window 150 of FIG. 3A after a selection is made by the user to review the contents of the first conversation 158-1 with Roy Andrews. The example contents of the first conversation 158-1 include four communication entries 160-1, 160-2, 160-3, and 160-4 (generally, 160). Each communication entry 160 corresponds to separate communication event. The initial communication entry 160-1 corresponds to a voicemail left by the user, Ted, on the answering machine of the other participant of the conversation, Roy. Associated with the communication entry are two articles: (1) a link, called Play, which plays back the recorded audio message; and (2) a link, called Transcribe, which converts the recorded audio message into text. The Play link can point to a storage location on a voicemail server where the recorded message is stored. In one embodiment, an administrator can lock the play back feature so that only the recipient of the message can play the recorded message (while the sender and other participants cannot).

The second communication entry 160-2 corresponds to a read receipt automatically generated by the conversation application server after the second participant, Roy, listens to the recorded voicemail. From this communication entry 160-2, the first conversation participant, Ted, can readily discern that Roy has heard the recorded message. The third communication entry 160-3 is Roy's response to Ted's recorded message. Roy added this communication entry 160-3 directly to the conversation 158-1 through Roy's conversation application client. The fourth communication entry 160-4 is another example of a communication event directly added by Roy to the conversation 158-1 through Roy's conversation application client. To this communication entry 160-4, Roy attaches an article, here a link to a PDF document that Ted can view through his conversation application client by clicking.

Figures 4A, 4B:
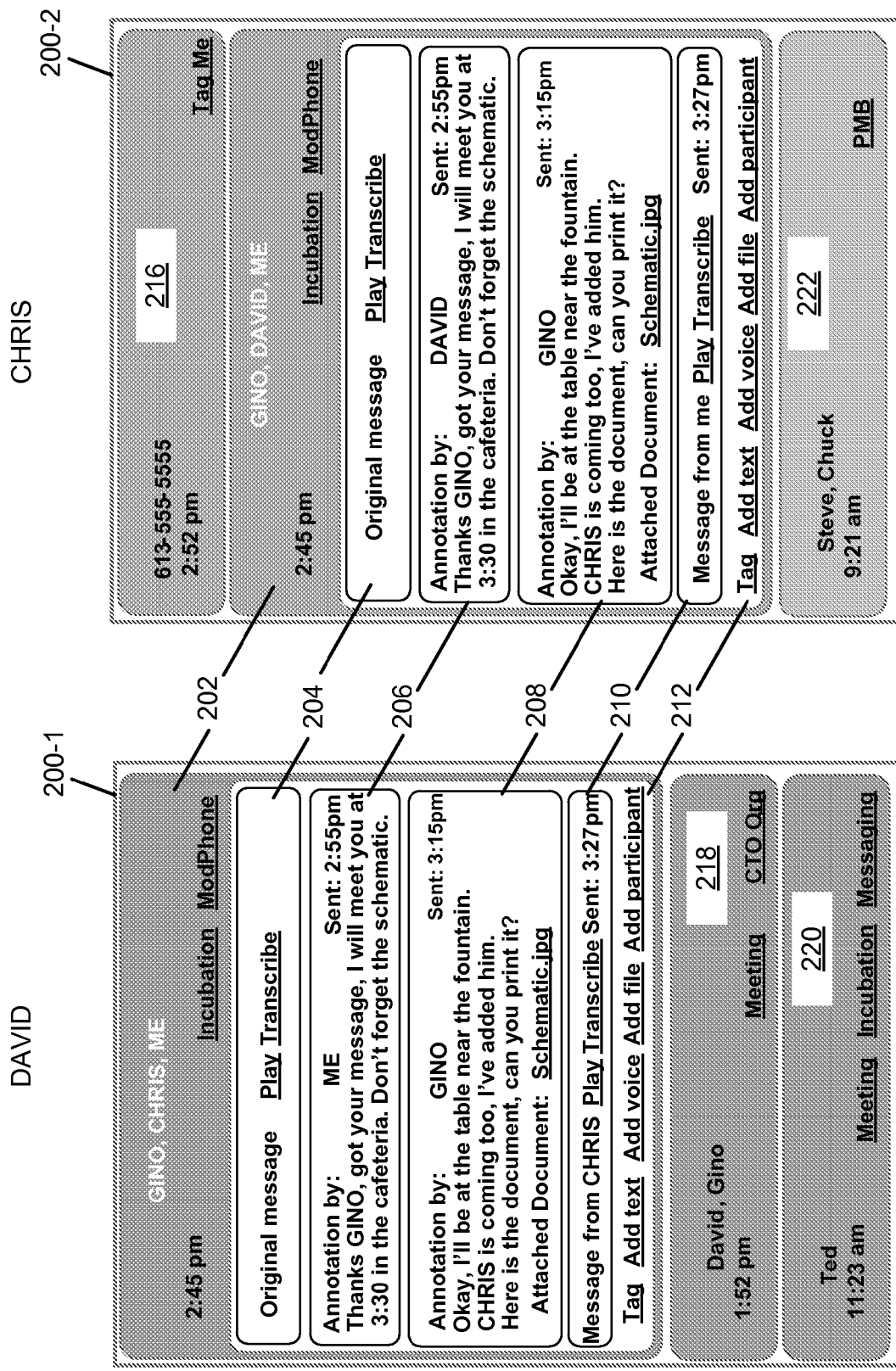
FIG. 4A and FIG. 4B are diagrams of an embodiment of a graphical user interface by which two users can view their respective lists of conversations.

FIG. 4A and FIG. 4B show another example of a user interface that may be presented on the displays of the electronic devices 34 through which users David and Chris can access their own lists of conversations 200-1, 200-2, respectively. David's conversation list 200-1 includes conversations 202, 218, and 220, whereas Chris's conversation list 200-2 includes conversations 202, 216, and 222. Because Chris is not a participant in David's conversations 218 and 220, neither of such conversations appears in Chris's conversation list 200-2; and because David is not a participant in Chris's conversations 216 and 222, neither of such conversations appears in David's conversations list 200-1. Conversation 202 appears in both lists 200-1, 200-2 because both David and Chris are participants in this conversation (along with Gino).

Conversation 202 includes four communication entries 204, 206, 208, and 210. Each participant in this conversation 202, namely Gino, David, and Chris, can review these events. The original communication entry 204 that started the conversation 202 is an audio message from Gino. The conversation application server could have initiated the conversation 202 in response to a cell phone call from Gino to David. Later, Gino adds Chris as a participant in the conversation (as indicated by Gino's comments in communication entry 208). Here, the timestamp of the original communication entry 204 serves as the timestamp for the conversation 202. In this example, the conversation 202 has two associated tags: Incubation and ModPhone. Associated with the communication entry 204 is a play function and a transcribe function.

The next communication entry 206, in time of occurrence and in sequence on the display, corresponds to an annotation added to the conversation 202 by David (through his conversation application client). Although David addresses the annotation to Gino, Chris can see the annotation after becoming a participant of the conversation 202.

The next communication entry 208 corresponds to an annotation added to the conversation 202 by Gino and includes an attached article, here a jpg file. David, Chris, and Gino can each access this jpg file, which need be stored only once in the database 14. In contrast, a conventional email from Gino to David and Chris, bearing the same message and jpg file as communication entry 208, would typically be stored three times in three different locations. Accordingly, an advantage of the present invention over conventional e-mail systems is a savings in storage; a message that is part of a conversation can be stored in just one location, whereas email systems save a copy of an email for each recipient (and often for the sender, too).

The most recent communication entry in the conversation 202, communication entry 212, is a recorded message from Chris. Chris added this recorded message to the conversation 202 through the conversation application client running on Chris's electronic device 34 (FIG. 1).

Various functions 212 are available to the participants for enhancing the conversation 202. These functions 212 include, but are not limited to, tagging the conversation, adding a text message, adding a voice message, adding a file, adding a new participant to the conversation, making a telephone call, sending an email message, IM, facsimile, SMS, and blog to new or existing participants, and checking the availability, presence, identity, and location of new or existing participants. Generally, when one participant modifies the contents of a conversation, the modification is observable by each other participant of the conversation (depending upon privacy settings, described below).

The ability to tag a conversation enables its participants to associate searchable metadata with the conversation. Such tags correspond to keywords designed to result in retrieving this particular conversation in response to a search. Tags may also be assigned to individual communication entries. The conversation application program can add some tags to conversations and to communication entries automatically.

The functions for adding text, voice, and files enable each participant to contribute one or more new communication entries to the conversation using various forms of media. Adding a participant expands the audience of the conversation. Added participants can be individuals or groups. In general, an added participant can contribute to the conversation. In one embodiment, an added participant can be given a status of a watcher of the conversation; that is, the added participant can view and monitor the conversation without being able to contribute to the conversation. Selecting the "add participant" function can operate to add a designated participant automatically or to send an invitation to that participant and wait for acceptance of the invitation before adding the participant to the conversation. The conversation application server can present this invitation as a new conversation between the inviter and invitee that, upon acceptance of the invitation, merges with the conversation to which the invitee is being invited. In one embodiment, one participant of the conversation can block all other participants from adding new recipients to the conversation, in effect, to make the conversation private.

The various functions 212 are just some examples that embodiments of the conversation application program can offer to users. For example, the conversation application program can include logic to perform any of the following operations on a conversation: adding, removing, and modifying tags; deleting or disbanding conversations; ending or closing a conversation; joining a conversation; splitting a conversation; merging conversations; adding articles to and removing articles from a conversation; converting an article to a different modality (e.g., text into voice, voice into text, image—fax, scanned document—into text. Examples of articles that may be attached to a conversation or to a communication event include, but are not limited to, voicemail, fax mail, email, instant messages, SMS, blogs, recorded voice call (in audio or transcribed format), voice logs, call logs (call detail records (CDR) records from a telephone switch or cell phone), IPDR (IP detail records), documents, and annotations (personal or shared).

Some of the functions can require agreement by every participant of a given conversation. For example, such functions can include deleting a conversation, adding a new participant, deleting a communication entry, deleting an article, changing a privacy setting on a conversation, communication entry, or article, splitting a conversation or merging conversations, transferring a conversation to another server system.

Viral Integration

Instances may occur when one user of the conversation application system receives notification of a newly generated conversation with a person who has not yet installed a conversation application client on their electronic device. Such an instance may occur when that person calls the user from a cell phone, and the server system 12 receives notification of the communication event. The conversation application system maintains registrations of those individuals who have installed the conversation application program on their electronic devices, and ensures that each user can determine whether other participants of a conversation are reachable through the conversation application system. If the other person is unreachable, the user can choose to communicate with that person using another mode of communication by which the person can be reached (e.g., email, telephone, cell phone, instant message). In addition, the user can use this opportunity to invite the person to start using (i.e., install) the conversation application client program on their electronic devices.

Privacy

In general, each participant of a conversation can view the contents (i.e., communication entries) of the conversation. Entire conversations and specific communication entries within a given conversation can have an associated privacy setting. Examples of settings for conversations can include, but not be limited to, private, semi-private, and public. Example settings for communication entries can include, without being limited to, personal and shared.

For example, one or more of participants of a conversation may desire to keep their conversation private, thereby permitting no one other than the participants to be aware of the conversation. For instance, two or more participants involved in a conversation can initiate a "side" conversation that is accessible only to them and not to the entire list of participants involved in the conversation. This side conversation has a private setting (which can be assigned by default upon the generation of the conversation) and each communication entry has a shared setting. One of the participants may want to add an annotation (i.e., a type of communication entry) to the conversation that is personal to that participant—in effect, a "note to self". Accordingly, the participant can assign a "personal" setting to the annotation that prevents the other participant from seeing the annotation or, if the annotation can be seen, from reading its contents.

With appropriate privacy settings, parents and guardians can obtain real-time access to the cell-phone conversations and text messages of their children, and employers and supervisors can have a similar ability to access the conversations of their employees, consultants, and contract workers.

Read Receipt and Delivery Receipt

When a user electronically sends an important message or document to another person, or leaves them a voicemail, often the user wants to know immediately and with certainty that the person has received and examined the message. Conventional email systems recognize this need and provide read receipt and delivery receipt mechanisms for email messages. Many recipient systems, however, do not support delivery receipts and many email recipients often disregard any request to send a read receipt upon opening the email. The conversation application system of the present invention provides a seamless, more reliable mechanism for read receipts and delivery receipts than conventional email systems. Moreover, read receipts and delivery receipts serve all modes of communication (i.e., not just email).

Delivery receipts are implicit. If a sender of a communication can view that particular communication within a conversation in the sender's conversation list, the sender can be confident that every other participant of that conversation also sees that communication in their own conversation list. This confidence results from a core characteristic of a conversation-centric system such as the conversation application system: if one person has access to the contents of a conversation, then all participants in that conversation share access to those contents (depending upon privacy settings).

Similar to delivery receipts, because one person in the conversation knows (or the system can discern that information) that a message has been read, that information can be propagated to all participants as desired or as allowed by the system administrator. To implement read receipts in the conversation application program, a new communication entry can be added to the conversation when the message is read, indicating the time of reading and the person who read the message. Alternatively, the communication entry can receive a timestamp, a certain icon, or a symbol signifying that the message has been read, and when and by whom. Participants of the conversation can directly determine the read status of a communication entry by the presence or absence of this timestamp, icon, or symbol.

Cell Phones/PDAs

Cell phones and PDAs are already ubiquitous. Such devices have enabled people to remain communicatively connected to their families, colleagues, businesses, and friends, while on the move. Installing the conversation application system of the invention on handheld, mobile devices, such as the BLACKBERRY™ and iPhone™, can further endear these devices to their users, empowering them with the ability to access, initiate, and carry on their conversations and to see delivery and read receipts in real time.

Collaborative Functionality: Examples of Voting and Scheduling

One practical use for the conversation application system of the present invention relates to voting. One user can initiate a conversation involving a list or participants and propose a topic upon which the participants are to conduct a vote. Each participant submits his or her vote through the user interface. If desired, the user interface can be configured to conceal the results of the vote until the voting has ended (or a time period for voting has elapsed).

The conversation application system can also be used to implement a vacation planner. A conversation object can be generated to receive the vacation schedules of a list of participant. Each participant submits a communication entry to the conversation, detailing her or his vacation schedule. In real time, each participant can then view the vacation schedules of every other participant who has submitted a communication entry.

Data Mining

The conversation-centric system of the present invention makes new types of information available for data mining engines. For example, analysis of the conversations of a user can reveal helpful patterns of behavior that can facilitate subsequent communications with the user. The analysis may reveal that the user has a preferred mode of communication at certain times of the day, or is consistently incommunicado during lunchtime. Because conversations gather together communication events made in all modes, it becomes easier to track the amount of time users spend communicating in general or specifically about a particular topic. From these conversations, users may be able to identify impediments to productivity (e.g., too many active conversations means resources are spread too thin, or project A is consuming far more time than project B). Consequently, use of the conversation application system may significantly reduce the time people spend communicating and the energy they expend in order to do so.

Conference Calls

Another practical use of the conversation application of the present invention is with conducting conference calls. When a conference call begins, a conversation object is generated. The attendees of the conference call are participants of the conversation. If one of the participants generates and submits minutes to the conversation (as a communication entry), each participant is able to view those minutes. Any recording of the conference call can be available to each participant (in a communication entry with a link for accessing the recording). "Side" conversations between subsets of participants can spawn from the conversation.

Call Centers

Call centers can make practical use of the conversation application system of the present invention. For example, when a caller calls a given call center, the conversation application server memorializes this communication event by generating a conversation. This conversation establishes the location of the caller in the call center's queue (i.e., conversation list), and the corresponding communication entry identifies the caller and information by which the caller may be reached. The caller can subsequently hang up the phone and wait for the call center to return the call. Alternatively, the caller can call back later without losing their place in the queue. Instead of calling back, the caller can reenter the queue using a different device, for example, a PDA, or through a different mode of communication, for example, a Web browser.

In addition, while the caller is in the queue, the manner of reaching the caller for communication may change. For example, the caller may have initially called the call center by telephone from a place of business and may now need to travel home. Accordingly, the caller calls the call center again to provide updated contact information (e.g., a cell phone number to be used for the commute home). A new communication entry with the updated contact information is thus added to the existing conversation in the queue of the call center. Again, the caller has not lost their place in the queue. If upon arriving home the call center has not yet returned the call, the caller can update the contact information yet again, leaving a home telephone number in a third communication entry that becomes part of the ongoing conversation.

Advantageously, conversations are distributable. Accordingly, a heavily occupied call center can reduce its backlog by transferring some of conversations in its conversation list to the conversation list of another less occupied call center.

Doctor/Patient Application

Another practical application for the use of conversations can be within the health-care industry. When a patient is admitted to a hospital, a shared persistent communication thread (i.e., conversation) can be generated for that patient. The participants in this conversation can be the doctors, specialists, nurses, and administrative staff. This conversation can serve as a means for centralizing information and activities related to the patient for the duration of the patient's stay, for example, scheduling rooms and equipment and exchanging test results. The conversation can also simplify the check out process for leaving the hospital. The conversation can contain a checklist of requirements that need fulfilling before the patient can leave. After check out, hospital administration can archive the conversation as part of the patient's overall health history.

Aspects of the present invention may be embodied in hardware or software (i.e., program code). Program code may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented in hardware (digital or analog), software, or a combination thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. A computer-implemented method of organizing communications, the method comprising:
   receiving notification of an occurrence of an event;
   generating, in response to the notification, a conversation object representing a conversation;
   associating a plurality of participants with the conversation;
   associating a communication entry with the conversation object, the communication entry having a message for one or more of the participants;
   storing the conversation object and the communication entry in persistent memory;
   limiting shared access to the conversation object stored in persistent memory to the plurality of participants associated with the conversation; and
   assigning a privacy setting to the communication entry to control which participants can learn the contents of the message.

2. The method of claim 1, further comprising adding an article to the communication entry associated with the conversation object.

3. The method of claim 2, wherein the article added to the communication entry associated with the conversation object includes an audio recording that each participant can play or transcribe to text.

4. The method of claim 2, further comprising assigning a privacy setting to the article to control which one or more of the participants are allowed to access the contents of the article.

5. The method of claim 1, further comprising adding to the conversation object an indicator viewable by each participant to signify that the message was read by one of the participants for whom the message is intended.

6. The method of claim 1, wherein receiving the notification occurs in response to polling an information source.

7. The method of claim 1, wherein the communication entry is a first communication entry corresponding to a first communication event involving the plurality of participants of the conversation, and further comprising: associating a second communication entry with the conversation object, the second communication entry corresponding to a second communication event involving the plurality of participants of the conversation, wherein a mode of communication used for the first communication event is different from a mode of communication used for the second communication event.

8. The method of claim 7, wherein the mode of communication for one of the first and second communication events is an email message and the mode of communication for the other of the first and second communication events is a cell phone call.

9. The method of claim 1, wherein the communication entry includes a link to the message that each participant can activate to acquire the contents of the message.

10. The method of claim 1, further comprising: adding a new participant to the conversation after the conversation object is generated and stored in persistent memory; and expanding the limited shared access to the conversation object to include the new participant.

11. The method of claim 1, further comprising assigning a public setting to the conversation to enable non-participants to monitor the conversation without being able to contribute to the conversation.

12. The method of claim 1 further comprising splitting said conversation into a plurality of conversations.

13. The method of claim 1 further comprising transferring a latest communication entry to another existing conversation.

14. A conversation application system, comprising:
a client system executing a conversation application client;
a server system executing a conversation application server, the conversation application server communicating with the conversation application client executing on the client system over a network, wherein one of the conversation application client and conversation application server receives notification of an occurrence of an event, generate in response to the notification a conversation object representing a conversation, associate a plurality of participants with the conversation, and associate a communication entry with the conversation object, the communication entry having a message for at least one of the participants, and wherein a privacy setting is assigned to the communication entry to control which participants can learn the contents of the message; and
persistent memory in communication with the conversation application server, the persistent memory storing the conversation object and the communication entry, wherein the conversation application server limits shared access to the conversation object stored in the persistent memory to the plurality of participants associated with the conversation.

15. The conversation application system of claim 14, wherein one of the conversation application client and conversation application server adds a new participant to the conversation after the conversation object is generated and stored in persistent memory, and the server system expands the limited shared access to the conversation object to include the new participant.

16. The conversation application system of claim 14, wherein the communication entry is a first communication entry corresponding to a first communication event involving the plurality of participants of the conversation, one of the conversation application client and conversation application server associates a second communication entry with the conversation object, the second communication entry corresponds to a second communication event involving the plurality of participants of the conversation, and a mode of communication used for the first communication event is different from a mode of communication used for the second communication event.

17. The conversation application of claim 14, wherein one of the conversation application client and conversation application server adds to the conversation object an indicator viewable by each participant of the conversation to signify that the message was read by one of the participants for whom the message is intended.

18. The conversation application system of claim 14 wherein said conversation is split into a plurality of conversations.

19. The conversation application system of claim 14 wherein a latest communication entry is transferred to another existing conversation.

* * * * *